(12) United States Patent
Matsumoto et al.

(10) Patent No.: US 6,275,925 B1
(45) Date of Patent: *Aug. 14, 2001

(54) PROGRAM EXECUTION METHOD AND PROGRAM EXECUTION DEVICE

(75) Inventors: Kenshi Matsumoto, Koshigaya; Yasuhito Koumura, Tokyo; Hiroki Miura, Warabi, all of (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,927

(22) Filed: Sep. 10, 1997

(30) Foreign Application Priority Data

Sep. 13, 1996 (JP) .................................................. 8-243886

(51) Int. Cl.[7] ........................................................ G06F 9/302
(52) U.S. Cl. .................................................................. 712/208
(58) Field of Search ........................................ 712/200, 208, 712/221

(56) References Cited

U.S. PATENT DOCUMENTS

| | | | |
|---|---|---|---|
| 4,003,033 | * 1/1977 | O'Keefe et al. | 395/287 |
| 4,112,490 | * 9/1978 | Hohlman et al. | 395/287 |
| 4,354,228 | * 10/1982 | Moore et al. | 395/800.13 |
| 4,450,519 | * 5/1984 | Guttag | 395/800.33 |
| 5,887,183 | * 3/1999 | Agarwal et al. | 395/800.02 |

OTHER PUBLICATIONS

NEC Corporation, "μPD77240 User Manual," pp. 66–70, 1990.

* cited by examiner

Primary Examiner—David Y. Eng
(74) Attorney, Agent, or Firm—Hogan & Hartson, LLP

(57) ABSTRACT

Disclosed is a program execution device capable of carrying out high-speed computation with a low amount of hardware and small program size, while permitting future expansion of the range of functions. General-purpose registers R0~R4 are virtual registers and a specific computation is related to read/write processing to and from each of these registers R0~R4. When instruction decoder 3 has decoded an instruction, if it has been determined that the instruction is a data transfer instruction denoting access to any one of the general-purpose registers R0~4, the computation related to the register to be accessed is carried out. A expanded range of computation types can be related to different general-purpose registers.

11 Claims, 3 Drawing Sheets

| ACCESS REGISTER | READ | WRITE |
|---|---|---|
| R0 | CLEAR | INPUT TO X |
| R1 | MAC RESULT OUTPUT | INPUT TO Y (UNSIGNED MAC) |
| R2 | MAC RESULT OUTPUT & CLEAR | INPUT TO Y (SIGNED MAC) |
| R3 | MULTIPLICATION OUTPUT | INPUT TO Y (UNSIGNED MULTIPLICATION) |
| R4 | (UNASSIGNED) | INPUT TO Y (SIGNED MULTIPLICATION) |

PROGRAM EXECUTION METHOD AND PROGRAM EXECUTION DEVICE

BACKGROUND OF THE INVENTION

1. Field of the Invention

The present invention relates to a program execution method and a program execution device using said method. In particular, the present invention relates to a program execution method and device using a general-purpose register for executing a program.

2. Description of the Related Arts

Most control-driven computers for sequentially fetching, decoding and executing instructions stored in a memory are used as program execution devices such as microprocessors.

FIG. 4 shows a configuration of a conventional RISC (Reduced Instruction Set Computer) System microprocessor which comprises a memory 1, an instruction fetch unit 2, an instruction decoder 3, a group of resisters 4, a computing unit 5 and a data access unit 6. In this configuration, instructions such as computing instructions, data transfer (load/store) instructions and such like are fetched from the memory 1 and designed; the computing unit 5 then carries out an arithmetic computation as indicated by the instruction sign.

Conventionally, in addition to an arithmetic and logic unit (ALU) for carrying out basic arithmetic operations such as addition, subtraction, logical OR and AND operations and such like, a computing unit 5 as shown in FIG. 4 further comprises, for instance, a multiplier connected in parallel thereto for carrying out multiplication at high speed. A computing unit in which an ALU for carrying out integer computations and an ALU for carrying out floating-point arithmetic computations are provided in parallel has also been used. When processing data using an arithmetic unit 5 comprising these types of computing devices, a general method has been to provide a computing instruction corresponding to a computation carried out by the computing device. This computation instruction is described in the program and read into the processor. In other words, in addition to basic computations such as ADD (Integer Addition), OR (logical OR) and the like, expanded arithmetic computation instructions such as MUL (Multiplication), MAC (Multiplication and Addition Calculation), FSUB (Floating-Point Subtraction) and such like can be described in a program and executed.

However, in this type of processor, it has not been possible to carry out a designated computation without first executing an instruction to prepare data required for the computation by storing the data in a computation data storage location (such as a register, for instance) and then executing an instruction to start and carry out the computation. For example, shown below is a program envisaged when carrying out repeated multiplication of operand data stored in a memory using an RISC processor. Here, since 2 load instructions are required in order to transfer data to 2 registers (R2, R3), at least 3 instructions must be executed for a single multiplication.

LD R2 (R0) (R2←memory (R0)
LD R3 (R1) (R3←memory (R1)
MUL R2 R3 (R2←R2×R3)

Consequently, even by installing a high-speed computing device capable of carrying out computations in 1 instruction cycle, the overall processing rate will remain at 3 instruction cycles for 1 computation, thereby hindering performance improvement.

The μPD77240 (Trademark) DSP manufactured by NEC Corp. is an example of technology intended to solve the above problem. The features of this DSP as detailed on page 66 of "μPD77240 User Manual" (September 1991) are as follows.

1. In addition to a conventional ALU, the DSP has a circuit for carrying out floating-point multiplication (FMPY). The ALU starts computation in response to a clear computation instruction (such as ADD or SUB) and the FMPY automatically starts computation of transferred data in compliance with a data transfer instruction.

2. In the FMPY, transfer data to registers K and L for multiplication input are multiplied in each instruction cycle. The multiplication result is output from the output bus of the FMPY one instruction cycle later and written in the multiplication output register M two instruction cycles later.

This DSP attempts to solve the problems mentioned above by starting multiplication only in compliance with a data transfer instruction.

However, in this DSP, the FMPY is only capable of floating-point multiplication. When other computations are desired, such as high-speed division, for instance, it is necessary to provide a dividing circuit having the same configuration as the FMPY. This dividing circuit also requires 2 input registers and 1 output register, consequently increasing the overall hardware size. With a RISC processor, since all types of arithmetic computations such as addition, subtraction, multiplication, division and trigonometric functions are required in order to carry out scientific and technical calculations used in image processing and CG and such like, if an additional 32-bit register has to be set for each computation, large-scale hardware will inevitably be required.

One method of solving this problem is to reduce the total number of registers by jointly using input registers K, L for multiple computations. In this case, however, it is necessary to specify which computation is to be carried out on input data. Such a specification cannot be carried out using a normal data transfer instruction and to clarify the computation would be contrary to the design principles of the FMPY.

SUMMARY OF THE INVENTION

The present invention has been conceived after consideration of the above-mentioned problems and aims to provide a program execution device capable of carrying out different computations at high speed with a low amount of hardware size. The present invention further aims to provide a program execution device capable of flexibly carrying out subsequent additional and expanded computations. Furthermore, the present invention aims to provide a program execution device which enables a user to easily program different computations.

(1) According to the program execution method of the present invention, a relation between a specific general-purpose register and a computation is set beforehand, and if the general-purpose register is described when a program is read out, a computation related to the general-purpose register is executed. Here, "general-purpose register" denotes a register capable of multiple applications and computations, the intention of which is different from a special-purpose register which is limited to a single computation such as, for instance, the DSP registers K and L mentioned above in the description of the related arts. In the appended claims, "computation" includes not only all arithmetic computations normally defined by that term, such as multiplication, floating-point arithmetic, specific calculations designed by a user, logical operations and such like, but also a variety of computations including processing relating to loading and storing of data required in processing.

According to this aspect of the present invention, since a different computation is allocated to each general-purpose register, there is no need to clarify the computation type. Therefore, a desired computation can be carried out at higher speed with just a few instruction steps. Furthermore, since a newly added computation can be related to a different general-purpose register, the range of functions can be expanded while maintaining upward compatibility. An advantage here is that the operation code of the instruction format does not have to be changed. Furthermore, in this aspect of the present invention, the user may carry out programming as usual using the general-purpose register. Consequently, there is no need for new programming techniques unfamiliar to the user.

(2) In another aspect of a program execution method of the present invention, when carrying out a computation related to the general-purpose register, the computation is carried out on data stored in that general-purpose register. For instance, if general-purpose register A is related to "addition", by transferring data to general-purpose register A, addition can be carried out using that data. In other words, in this aspect of the present invention, the general-purpose register does not only indicate the type of computation to be carried out, but also simultaneously becomes the source register of the computation. As a result, programming can be carried out naturally and efficiently.

(3) In another aspect of a program execution method of the present invention, when carrying out a computation related to the general-purpose register, the computation to be carried out is specified after first considering the access state of the general-purpose register. A conventional general-purpose register has 2 access states: read and write. It is thus possible to designate an even greater number of computations by utilizing the difference between these two access states.

(4) The program execution device of the present invention comprises a general-purpose register for storing data to be computed; decoder for identifying a computation related in advance to a general-purpose register when said general-purpose register is coded in a program; and computing unit for carrying out an identified computation to data stored in the general-purpose register.

In this configuration, decoder decodes a program which has been readout. When the point at which a general-purpose register is described is reached, the decoder identifies the computation related to that register. For example, the computation may be: "General-purpose register A=ADD". The computing unit then carries out the computation which has been identified on data stored in the general-purpose register.

In this aspect of the invention, a computation can be specified by, for instance, a data transfer instruction which loads data into the general-purpose register. This has the same effects as explained in (1) above.

(5) In another aspect of the present invention, the decoder identifies a computation after considering the access state of the general-purpose register. This is based on the same principle as explained in (3) above, and produces similar effects.

(6) According to another aspect of the present invention, the general-purpose register in cases (4) and (5) is treated as a virtual register for indicating the computation to which the register is related. In this case, the general-purpose register can be viewed as addressing means for simultaneously specifying a data destination and a computation to be carried out on said data. Therefore, provided that the destination has a data storage section, the general-purpose register need not actually store the data.

According to this aspect, the amount of hardware size required can be significantly reduced in comparison with a case where a group of general-purpose registers is provided for each type of computation.

(7) In another aspect of the program execution device of the present invention, when data has been transferred to a general-purpose register by executing a data transfer instruction, the computing unit starts computation, related to the general-purpose register, of the data. In this configuration, the computing operation of 2 operands can be automatically started by means of 2 load instructions, thereby enabling the computation to be carried out at high speed with few instruction steps.

For a more complete understanding of the present invention and the advantages thereof, reference is now made to the following description taken in conjunction with the accompanying drawings.

DESCRIPTION OF THE PREFERRED EMBODIMENTS

Figures 3, 4:
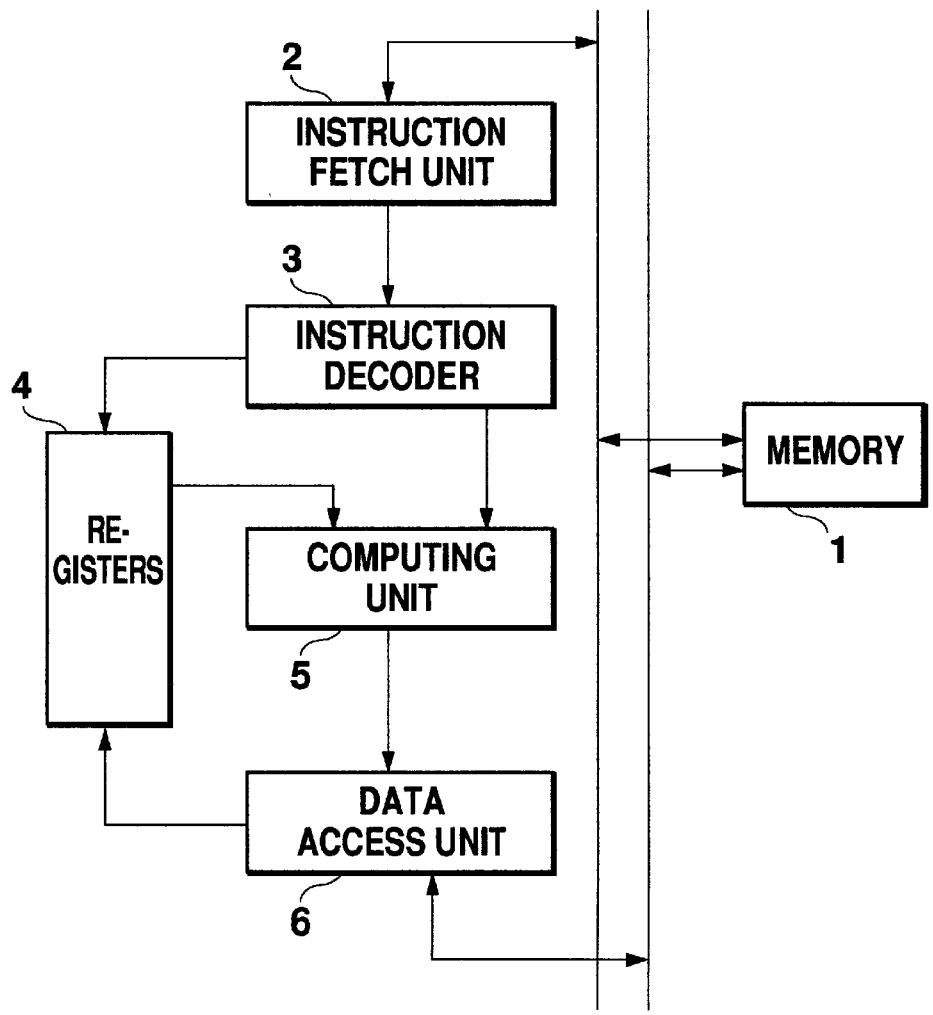
FIG. 3 is a diagram depicting the relationship between virtual registers R0~4 and their corresponding access states and specified computation types.
FIG. 4 is a diagram depicting a configuration of a conventional generally used RISC processor.

The preferred embodiments of the present invention will next be explained with reference to the diagrams. The present embodiment explains a program execution device which automatically starts computation in response to an instruction to transfer data to a specific general-purpose register. In this device, computation in a computing unit identical to that shown in FIG. 4 is started in the normal manner by a clear computation instruction, while computation in another computing unit (hereinafter "second computing unit") is started only in response to an instruction to transfer data to a specific general-purpose register.

Let us suppose, for example, that this device has a total of 16 general-purpose registers R0~R15. Of these 16, 11 registers R5~15 belong to resisters 4 (explained below) and 5 registers R0~4 are virtual registers characteristic to the present embodiment.

Figure 1:
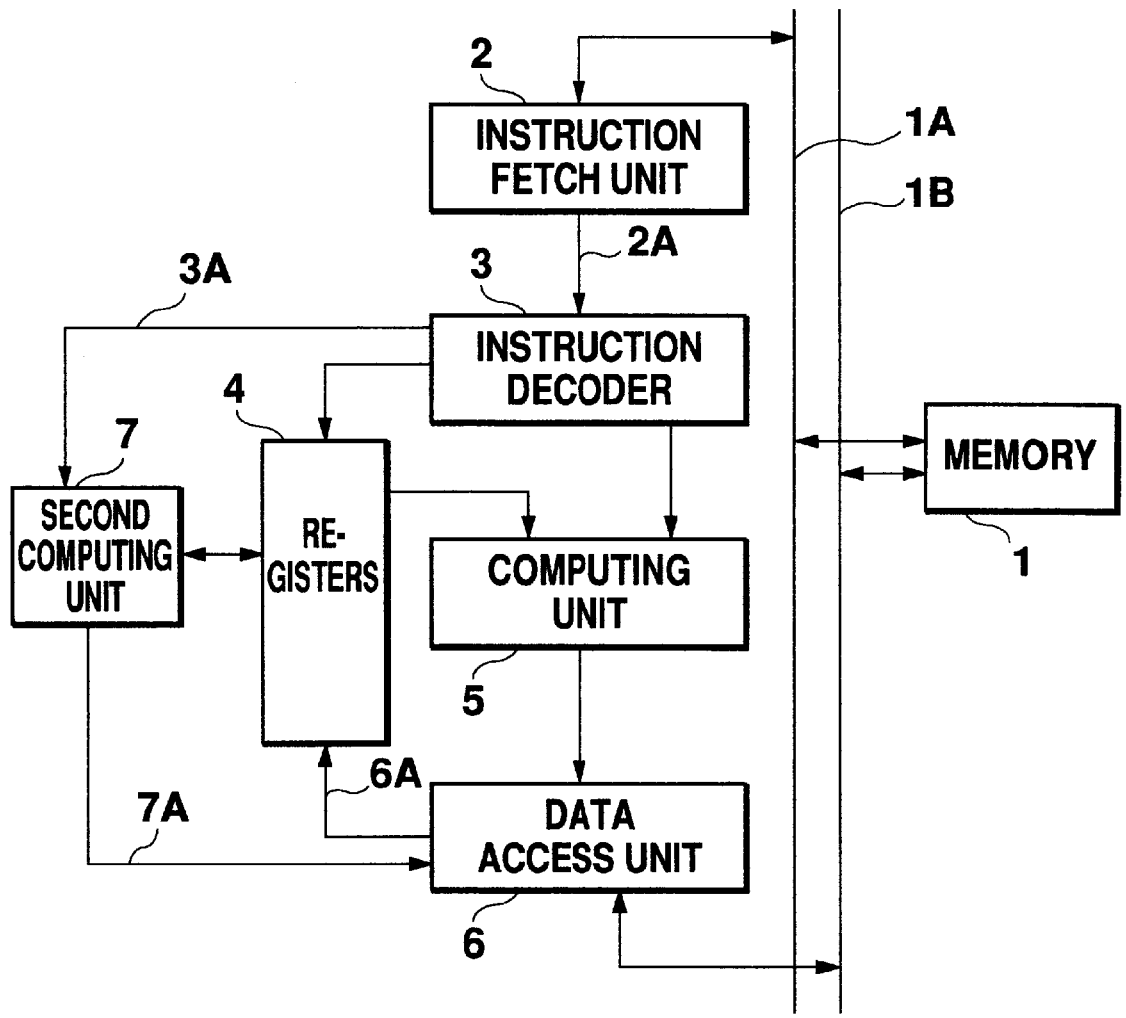
FIG. 1 is a diagram depicting an overall configuration of a program execution device according to an embodiment of the present invention.

FIG. 1 shows an overall configuration of a program execution device in the present embodiment. In FIG. 1, instructions and data are stored in memory 1. Instructions are accessed via instruction bus 1A; data are accessed via data bus 1B. Instruction fetch unit 2 sequentially fetches instructions such as data transfer instructions and computation instructions from memory 1 and passes them through signal line 2A to instruction decoder 3.

In accordance with the instruction type, instruction decoder 3 splits the instruction code into predetermined fields and extracts an operation indicating the type of computation to be carried out, an operand having an immediate data contained in the instruction code, source and destination register numbers and the like. Here, it is judged whether the computation will use second computing unit 7 by determining if the register number is 0~4, that is, if the register is one of the virtual registers.

When the operation designates a normal computation instruction, computing unit 5 carries out a normal computation on the source operand. The result of this computation is sent via signal line 5A to data access unit 6 and rewritten via signal line 6A in a register in resisters 4 indicated by the destination register number.

Alternatively, when the operation designates a data transfer instruction, if the general-purpose register described in the instruction is any one of R0~R4, the computation is carried out by second computing unit 7. In this case, operand data is sent from instruction decoder 3, not to resisters 4, but directly to second computing unit 7 via signal line 3A. After carrying out a computation characteristic to the present device, the computation result is sent via signal line 7A to data access unit 6.

Figure 2:
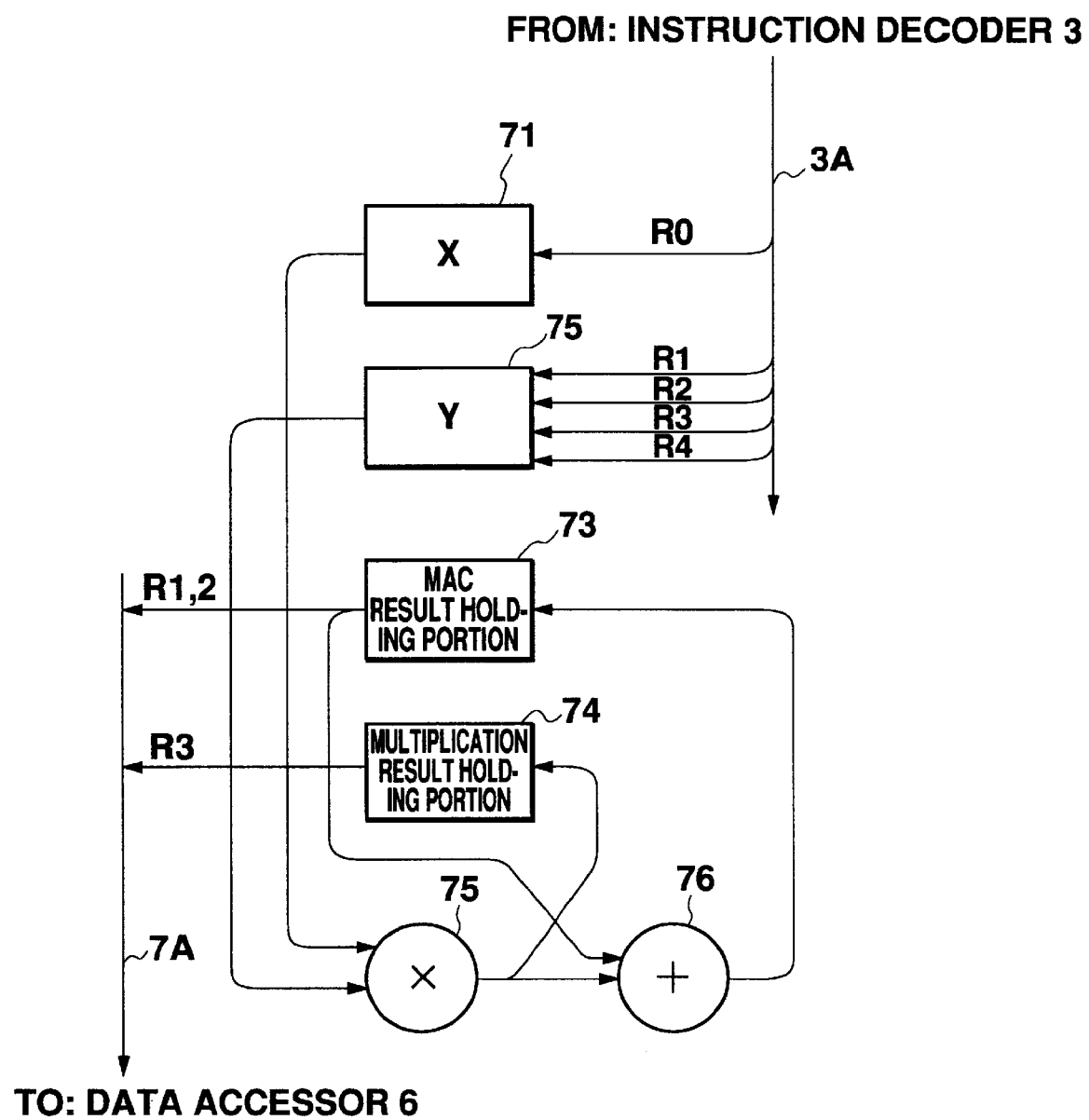
FIG. 2 is a diagram depicting an internal configuration of the second computing unit 7 shown in FIG. 1.

FIG. 2 shows the internal configuration of second computing unit 7. In the present embodiment, second computing unit 7 carries out normal multiplication and MAC consisting of complex multiplication and addition. Such MAC are often used in audio processing, image processing and the like.

In FIG. 2, X register 71 and Y register 72 are both actual registers which store operand data for computation. These data are sent from instruction decoder 3. Each of X, Y registers 71 and 72 has a data existent flag (not shown in the diagram) which is set when data is stored, and reset when computation is under way and the register is ready to receive the next data. Multiplication or MAC calculation commences automatically each time both the 2 flags are set.

MAC results and multiplication results are stored respectively in MAC result holding portion 73 and multiplication result holding portion 74. Multiplier 75 (indicated in FIG. 2 by x) and adder 76 (indicated by +) respectively carry out multiplication and addition to data input thereto and output the result. The outputs from X register 71 and Y register 72 are applied to multiplier 75. Multiplier 75 carries out multiplication and sends the result to multiplication result holding portion 74 and adder 76. The outputs of MAC result holding portion 73 and multiplier 75 are then applied to adder 76. Adder 76 carries out addition and outputs the result to MAC result holding portion 73. Data read out from MAC result holding portion 73 and multiplication result holding portion 74 are sent to data access unit 6.

FIG. 3 shows the relationship between virtual registers R0~R4 and their corresponding access states and types of computations specified. In the diagram, access state "READ" indicates that data is to be read out from the general-purpose register; this maybe, for instance, a data store instruction into the memory or a move (copy) instruction to move data to another general-purpose register. Alternatively, access state "WRITE" may for instance constitute an instruction to load data from the memory into the register, or a move (copy) instruction to move data from another general-purpose register, or an instruction to move (write) data to the general-purpose register from another general-purpose register, this move (write) instruction having an immediate data.

1. Write operation to each register.

When data is written to register R0, immediate data contained in the write instruction (defined as d0) is written unaltered into X register 71.

Writing of data in register R1 denotes an unsigned MAC using d0 and immediate data (d1) which is carried out simultaneously with the writing of data d1 into Y register 72. In other words, multiplier 75 executes an unsigned multiplication of data d0 and d1, the adder 76 adds this multiplication result to the preceding MAC result, and the final result is stored in MAC result holding portion 73 as the new MAC result.

Data is written into register R2 in the same manner as to register R1, with the difference that the computation is carried out after consideration of the sign.

Writing of data to register R3 denotes an unsigned MAC using d0 and immediate data (d2) which is carried out simultaneously with writing of data d2 into Y register 72. In other words, multiplier 75 executes an unsigned multiplication of data d0 and d2 and the result is stored in multiplication result holding portion 74. Data is written to register R4 in the same manner as register R3, with the difference that computation is carried out after consideration of the sign.

2. Read operation from each register

When data is read out from register R0, the contents of MAC result holding portion 73 and multiplication result holding portion 74 are cleared to be used for commencing a new MAC or such like.

When data is read out from register R1, data stored in MAC result holding portion 73 can be read out. This also applies when reading out from register R2, but in this case the content of MAC result holding portion 73 is cleared after reading. When reading from register R3, data stored in multiplication result holding portion 74 is read out.

In the above configuration, when carrying out an unsigned multiplication on operand data stored at memory addresses indicated by registers R5 and R6, for instance, the following program may be used. Only 2 instructions are required here.

LD R0, (R5) (R0←men (R5))
    LD R3, (R6) (R3←men (R6))

As another example of processing, let us consider a signed MAC for calculating the AND of a one-dimensional array of data stored in memory and storing the result as a one-dimensional array in the memory.

MOV R5, R0 (clear MAC result holding portion 73)
    L1: LD R0, (R6++) (R0←men (R6) , R6←R6+1)
    LD R2, (R7++) (R2←men (R7), R7←R7+1)
    CB R9, L1
    (Branching if R9 is non-zero. Post-determination R9←R9−1)
    NOP (delay slot for branching instruction)
    MOV R8, R1 (result is stored in R8)

Here, a signed MAC is carried out on operand data stored at memory addresses indicated by registers R6 and R7 and the result is stored in register R8. Register R9 is used as a counter.

The embodiment described above does not require a large amount of hardware since registers R0~4 do not actually exist.

Nevertheless, a variety of computations can be efficiently designated and executed at high speed using register numbers and access states. Furthermore, since a new computation type can be added without having to add a new instruction, the range of functions can be expanded and programming is extremely simple. The following variations to the present embodiment are conceivable.

(1) In this embodiment, a specific general-purpose register designates a specific computation type and computation is started in accordance with the state of a data existent flag. However, the need for this data existent flag can be removed by allowing the designated general-purpose register not only to designate the computation type but also to start the computation. In the present embodiment, this function can be appended to registers R1–4 which specify writing of data in Y register 72.

(2) In the present embodiment, second computing unit 7 started computation automatically in compliance with a data transfer instruction, but this invention can also be applied to the architecture of a conventional program execution device which starts computation in response to a clear computation instruction.

While there have been described what are at present considered to be preferred embodiments of the invention, it will be understood that various modifications maybe made thereto, and it is intended that the appended claims cover all such modifications as fall within the true spirit and scope of the invention.

What is claimed is:

1. A program execution method comprising:

decoding a program instruction;

if the decoded instruction describes one of a first plurality of registers, executing at least one computation, the executed computation being determined based on the described register according to a predetermined correspondence between the first plurality of registers and a plurality of computations; and if the operand in the instruction designates a particular register, instructing a particular computation and executing that computation, the particular computation correlated in advance with the particular register such that the computation can be executed only by having the register described in the instruction, without depending on any execution of computation instructed by an operation code within the instruction.

2. The method of claim 1, wherein the first plurality of registers are virtual registers.

3. The method of claim 1, wherein the first plurality of registers are general purpose registers.

4. The method of claim 1, wherein the computation is executed using data stored in the described register.

5. A program execution method comprising:

decoding a program instruction; and if the decoded instruction describes one of a first plurality of registers, executing at least one computation, the executed computation being determined based on the described register according to a predetermined correspondence between the first plurality of registers and a plurality of computations, wherein an operation is obtained in the decoding step, the operation designating a type of access to the register, and wherein the at least one computation executed in the executing step is determined based on the described register and the designated type of access according to a predetermined correspondence between the first plurality of registers, the types of access and a plurality of computations.

6. A program execution method comprising:

decoding a program instruction to obtain an operation;

if the decoded instruction describes one of a first plurality of registers and the obtained operation designates a read operation, executing at least one first computation, the first computation being determined based on the described register according to a first predetermined correspondence between the first plurality of registers and a plurality of computations; and if the decoded instruction describes one of a first plurality of registers and the obtained operation designates a write operation, executing at least one second computation, the second computation being determined based on the described register according to a second predetermined correspondence between the first plurality of registers and a plurality of computations.

7. A program execution device comprising:

a first plurality of registers;

a decoder for decoding a program instruction, and when the decoded instruction describes one of a first plurality of registers, for specifying at least one computation based on the described register according to a predetermined correspondence between the first plurality of registers and a plurality of computations;

a computing unit for executing the specified computation; and means for the decoder to instruct of a particular computation to a computing unit if the operand in the instruction designates a particular register, the particular computation correlated in advance with the particular register such that the computation can be executed only by having the register described in the instruction, without depending on any execution of computation instructed by an operation code within the instruction.

8. The device of claim 7, wherein the computing unit executes the specified computation using data stored in the described register.

9. The device of claim 7, wherein the registers are general-purpose registers.

10. The device of claim 7, wherein the registers are virtual registers.

11. A program execution device comprising:

a first plurality of registers;

a decoder for decoding a program instruction, and when the decoded instruction describes one of a first plurality of registers, for specifying at least one computation based on the described register according to a predetermined correspondence between the first plurality of registers and a plurality of computations; and a computing unit for executing the specified computation, wherein the decoder obtains an operation by decoding the program instruction, the operation designating a type of access to the register, and wherein the decoder specifies the at least one computation based on the described register as well as the type of access according to a predetermined correspondence between the first plurality of registers, the type of access and a plurality of computations.

\* \* \* \* \*